US006041225A

United States Patent [19]

Jung

[11] Patent Number: 6,041,225

[45] Date of Patent: Mar. 21, 2000

[54] MONITOR CONTROL CIRCUIT USING WIRELESS HEADPHONES AND METHOD THEREFOR

[75] Inventor: Sung-Gon Jung, Kyunki-do, Rep. of Korea

[73] Assignee: SamSung Electronics Co., Ltd., Suwon, Rep. of Korea

[21] Appl. No.: 08/959,067

[22] Filed: Oct. 28, 1997

[30] Foreign Application Priority Data

Oct. 28, 1996 [KR] Rep. of Korea ...................... 96-49290

[51] Int. Cl.[7] ...................................................... H04B 1/06

[52] U.S. Cl. ............................ 455/352; 455/66; 455/575

[58] Field of Search ................................. 455/66, 90, 92, 455/95, 67.1, 100, 352, 575; 348/734; 381/14

[56] References Cited

U.S. PATENT DOCUMENTS

| | | | |
|---|---|---|---|
| 4,807,052 | 2/1989 | Amano | 358/194.1 |
| 5,001,774 | 3/1991 | Lee | 455/151 |
| 5,553,312 | 9/1996 | Gattey et al. | 455/66 |
| 5,671,158 | 9/1997 | Fournier et al. | 364/514 R |
| 5,771,441 | 6/1998 | Altstatt | 455/66 |

*Primary Examiner*—Reinhard J. Eisenzopf
*Assistant Examiner*—Sam Bhattacharya
*Attorney, Agent, or Firm*—Robert E. Bushnell, Esq.

[57] ABSTRACT

A circuit for controlling a monitor receiving a speaker input signal includes wireless headphones for outputting a first control signal based on a user input command; a radio transceiver for generating a second control signal based on the first control signal from the wireless headphones; a first microcomputer for generating a switching control signal according to the second control signal from the radio transceiver; and a switch for receiving the speaker input signal and outputting the received speaker input signal to the radio transceiver as a controlled audio signal, according to the switching control signal from the first microcomputer.

13 Claims, 6 Drawing Sheets

MONITOR CONTROL CIRCUIT USING WIRELESS HEADPHONES AND METHOD THEREFOR

CLAIM OF PRIORITY

This application makes reference to, incorporates the same herein, and claims all benefits accruing under 35 U.S.C §119 from an application entitled Monitor Control Circuit Using Wireless Headphones And Method Therefor earlier filed in the Korean Industrial Property Office on Oct. 28, 1996, and there duly assigned Serial No. 96-49290 by that Office.

BACKGROUND OF THE INVENTION

1. Field of the Invention

The present invention relates to a monitor control circuit and method and, more specifically, to a monitor controlling circuit and method using wireless headphones to control monitor power and an audio mode thereof.

2. Discussion of Related Art

Multimedia computers, having multiple audio and video functions and using built-in sound cards and video cards, are widely distributed, such that a personal computer can now be readily used in place of a home entertainment center. The wide range of uses cover the execution of audio/video playback and include television features as well as games. The control of these various attributes, particularly the audio portion of a multimedia computer having built-in sound card capabilities, is typically performed at the monitor through direct manual contact by a user.

It is noticed that there is an inconvenience in that the control buttons attached to the monitor or the keyboard attched to the computer must be used to control the audio. Accordingly, there is a need for remote-controlling the audio output of a monitor.

SUMMARY OF THE INVENTION

It is therefore an object of the present invention to provide a monitor controlling circuit in which an audio mode of the monitor can be remotely controlled.

It is another object of the present invention to provide a monitor controlling circuit in which a power mode of the monitor can be remotely controlled.

It is yet another object of the present invention to provide a method for controlling the aforementioned circuits.

To accomplish the object of the present invention, there is provided a circuit for controlling a monitor receiving a speaker input signal, the circuit comprising: wireless headphones for outputting a first control signal based on a user input command; a radio transceiver for generating a second control signal based on the first control signal from the wireless headphones; a first microcomputer for generating a switching control signal according to the second control signal from the radio transceiver; and switching means for receiving the speaker input signal and outputting the received speaker input signal to the radio transceiver as a controlled audio signal, according to the switching control signal from the first microcomputer.

To accomplish another aspect of the present invention, there is provided a method of controlling a monitor, comprising the sequential steps of: sensing a remote control signal output from wireless headphones; determining which one of a plurality of control signals the remote control signal corresponds to when the remote control signal is sensed; and controlling power of the computer monitor or selectively outputting an audio signal to the wireless headphones or a speaker of the computer monitor depending on which one of the plurality of control signals the remote control signal corresponds to in the determining step.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF THE PREFERRED EMBODIMENT

Figure 1:
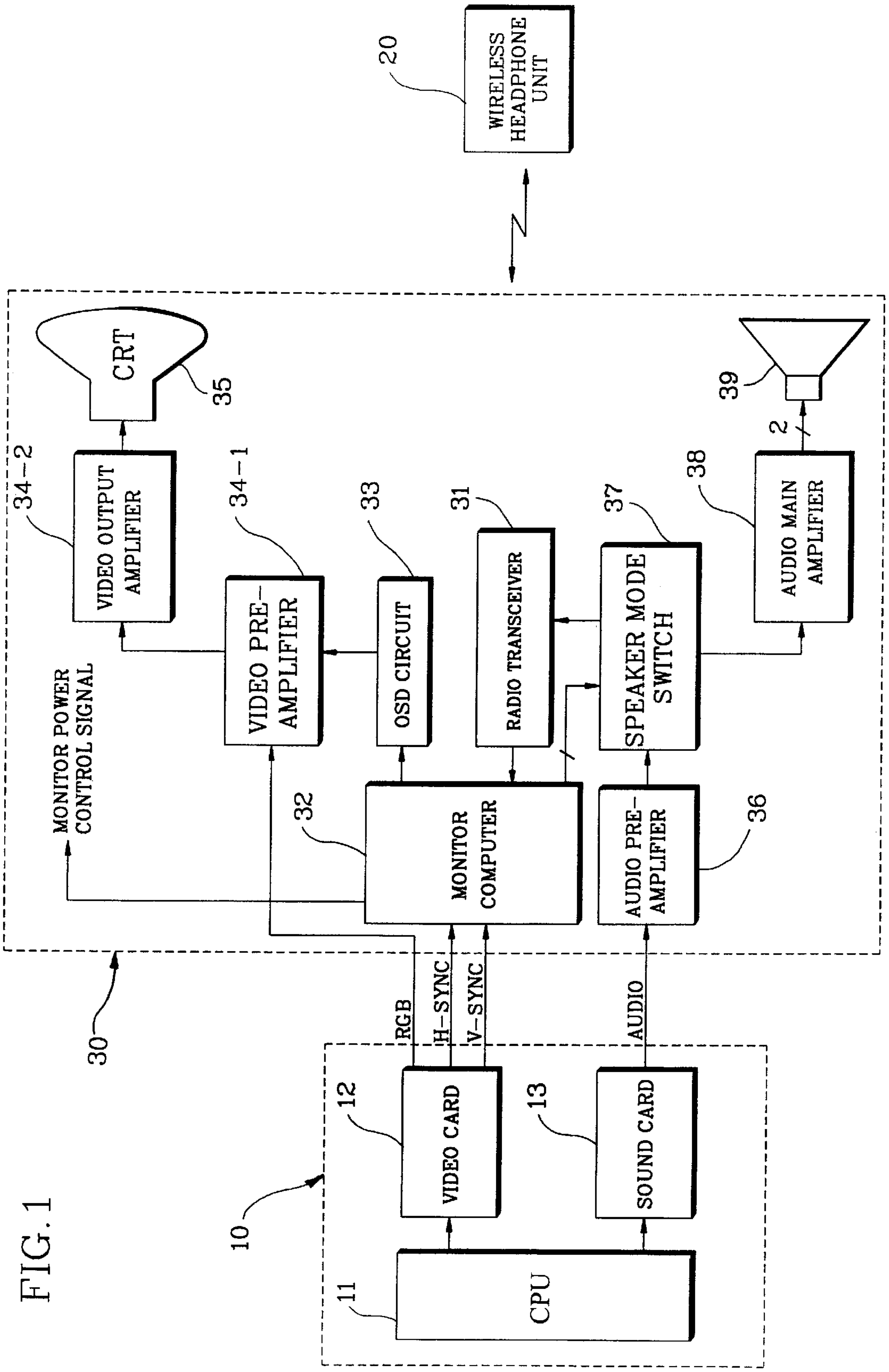
FIG. 1 is a block diagram of a monitor control circuit using wireless headphones according to the principles of the present invention.

Referring now to FIG. 1 of the drawings, the monitor control circuit using wireless headphones according to the present invention largely comprises: a computer mainframe 10, a wireless headphone unit 20, and a monitor 30.

Computer mainframe 10 includes: a CPU (central processing unit) 11 for processing audio and video data, to generate audio and video control signals; a video card 12 for generating an RGB (red, green and blue) video signal and horizontal and vertical sync signals based on the video control signal from CPU 11; and a sound card 13 for generating an audio signal based on the audio control signal from CPU 11.

Wireless headphone unit 20 generates a wireless headphone remote control signal for output to monitor 30, which includes monitor power control data, headphone speaker control data, and monitor speaker control data.

Monitor 30 comprises: a monitor microcomputer 32 for receiving the control signals from a radio transceiver 31 and outputting an OSD (on-screen display) signal according to monitor power control data, headphone speaker control data, monitor speaker control data, and the control signals from radio transceiver 31, and for generating a speaker mode signal, a volume control signal, and a monitor power control signal; a speaker mode switch 37 for selecting the desired audio output means based on the speaker mode signal output from monitor microcomputer 32; and radio transceiver 31 for relaying the wireless headphone remote control signals from the wireless headphone unit 20 to the monitor microcomputer 32, and routing the audio signal output from sound card 13 to wireless headphone unit 20. Monitor 30 further includes: an OSD circuit 33 for receiving the OSD signal from monitor microcomputer 32 and carrying out OSD processing; a video pre-amplifier 34-1 for amplifying the RGB video signal output from video card 12 together with the OSD signal output; a video output amplifier 34-2 for amplifying the output from video pre-amplifier 34-1 for display via a CRT (cathode ray tube) 35; an audio pre-amplifier 36 for amplifying the audio signal output from sound card 13; an audio main amplifier 38 for driving a monitor speaker 39 according to the applied audio signal.

In the operation of the above-described monitor control circuit according to the present invention, when executing a multimedia computer program including audio and video data, such as a video game or motion picture program, computer mainframe 10 outputs RGB video data and audio data, respectively, through video card 12 and sound card 13 based on the execution command of CPU 11. Here, horizontal and vertical sync signals are applied to monitor microcomputer 32 in order to generate a picture control signal for synchronizing the RGB video signal.

Monitor microcomputer 32 also generates OSD data according to the monitor power control signal, speaker mode selection signal and speaker volume control signal, based on the wireless headphone remote control signal input via radio transceiver 31. That is, when a user manipulates wireless headphone unit 20 to output the desired wireless headphone remote control signal to radio transceiver 31, the control signals are relayed to monitor microcomputer 32 which then generates new OSD data based on that previously stored and the received control signal and outputs an OSD gain signal to OSD circuit 33. By doing so, the control signals are selectively displayed for confirmation by the user.

The OSD gain signal is applied to video pre-amplifier 34-1, to be amplified together with the RGB video signal from video card 12. Here, the RGB video signal and the OSD signal are selectively output from pre-amplifier 34-1 according to an OSD selection signal, and then amplified by video output amplifier 34-2 for display on CRT 35. On the other hand, when the OSD selection signal is not applied to video pre-amplifier 34-1, only the RGB video signal is output to video output amplifier 34-2.

Meanwhile, audio pre-amplifier 36 amplifies the audio output from sound card 13 and applies the amplified signal to the speaker mode switch 37 which, based on the speaker mode so selection signal from monitor microcomputer 32, selectively outputs a monitor audio signal to audio main amplifier 38 and a wireless headphone audio signal to radio transceiver 31. If the monitor audio signal is selected, monitor speaker 39 is driven; and if the wireless headphone audio signal is selected, radio transceiver 31 sends the audio signal to the wireless headphone unit 20.

The wireless headphone remote control signal output from wireless headphone unit 20 is relayed to monitor microcomputer 32 through radio transceiver 31, where the monitor power control signal thereof is processed for output to a power circuit (not shown) and the speaker control signals thereof are applied to speaker mode switch 37. Thus, the monitor power and the speaker volume and selection can be remote-controlled using wireless headphone unit 20.

Figure 2:
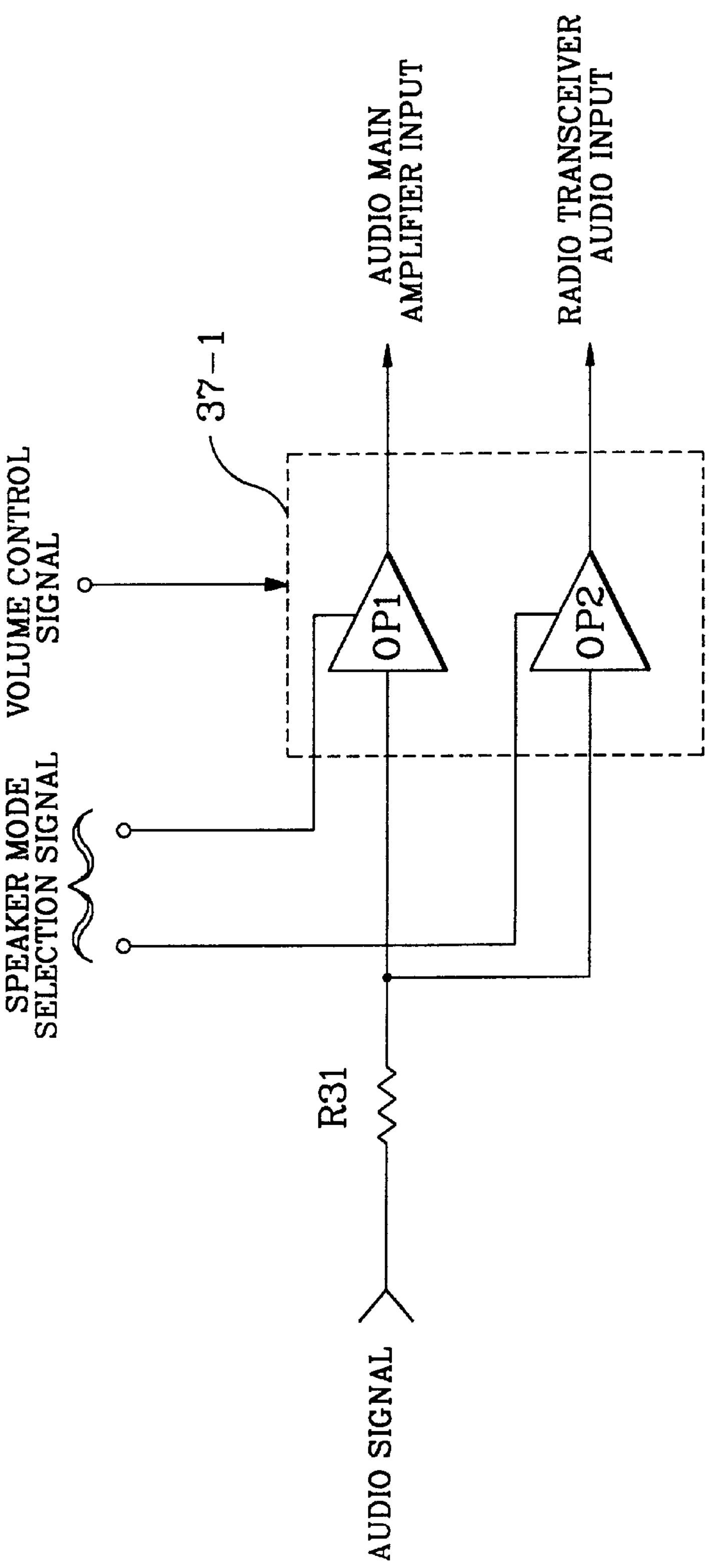
FIG. 2 is a detailed block diagram of the speaker mode switch shown in FIG. 1.

Referring to FIG. 2, speaker mode switch 37 includes an input resistor R31 for receiving the output from the audio pre-amplifier 36, and a switch IC 37-1 for selectively outputting the audio signal input via a pair of operational amplifiers OP1 and OP2 based on control signals applied from monitor microcomputer 32. A speaker mode selection signal output from monitor microcomputer 32 enables either operational amplifier OP1 for outputting the audio signal to audio main amplifier 38 and monitor speaker 39 or operational amplifier OP2 for outputting the audio signal to the radio transceiver 31. The volume control signal output from monitor microcomputer 32 controls the overall gain of the switch IC 37-1.

Figure 3:
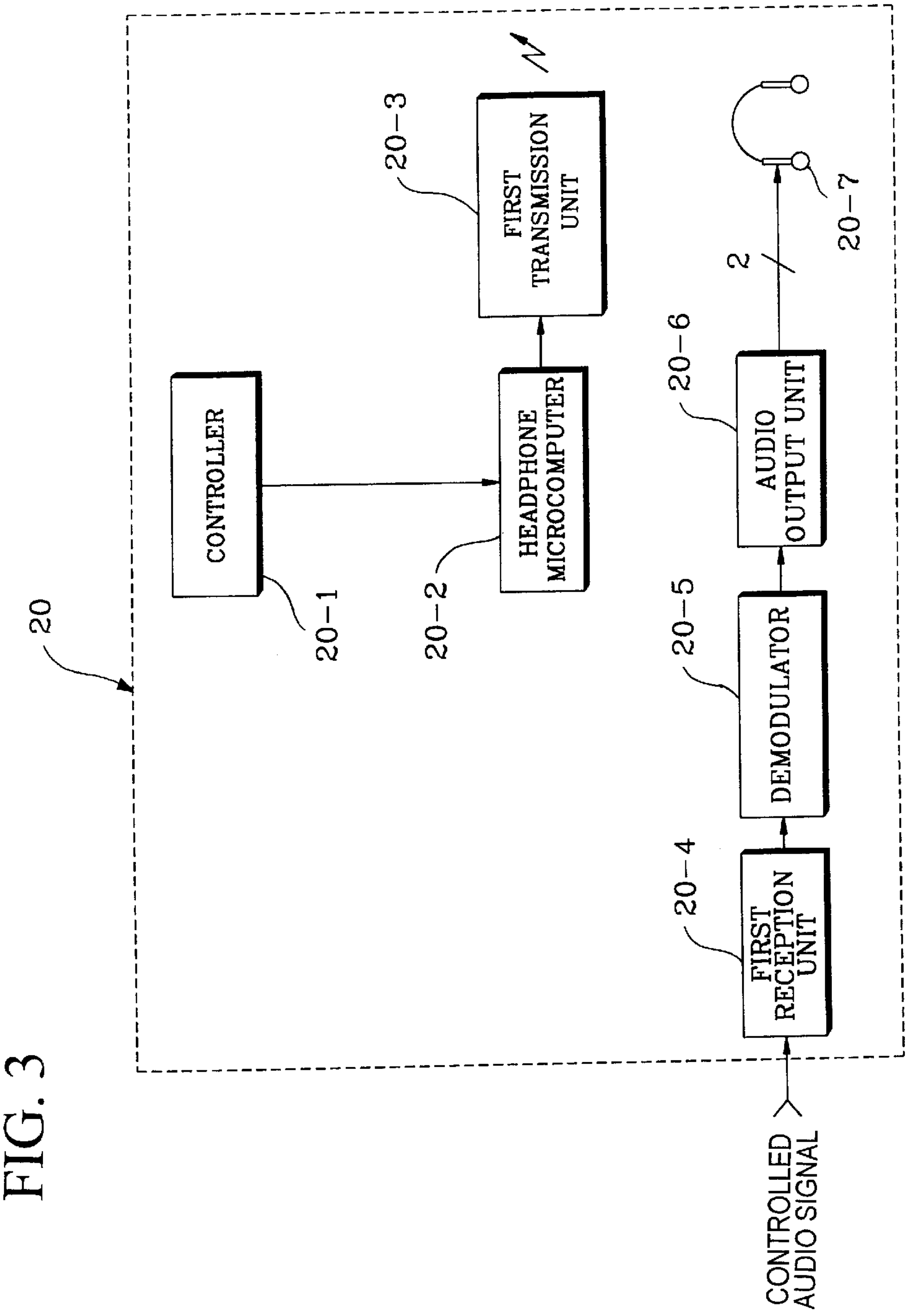
FIG. 3 is a detailed block diagram of the wireless headphone unit shown in FIG. 1.

Referring to FIG. 3, wireless headphone unit 20 includes: a controller 20-1 for generating the monitor power control signal, speaker mode control signal and speaker volume control signal, according to user manipulation of a headphone-mounted control panel (not shown); a headphone microcomputer 20-2 for generating a wireless headphone remote control signal based on the output from the controller 20-1; a first transmission unit 20-3 for converting the output of the headphone microcomputer 20-2 into an optical signal for transmission to monitor 30; a first reception unit 20-4 for receiving, as light (infrared), the controlled audio output from monitor 30; a demodulator 20-5 for demodulating the output from first reception unit 20-4; and an audio output unit 20-6 for outputting the demodulated audio signal to headphones 20-7.

Figure 4:
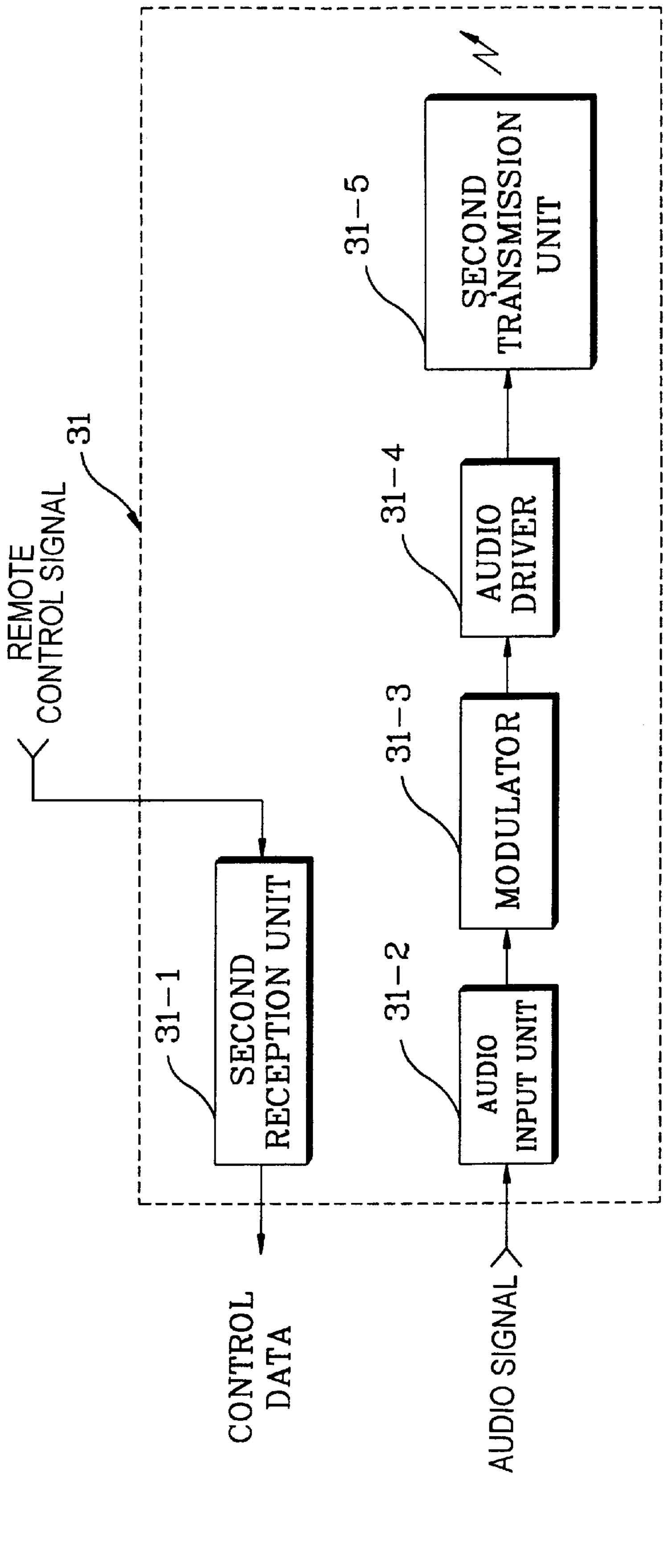
FIG. 4 is a detailed block diagram of the radio transceiver shown in FIG. 1.

Referring to FIG. 4, radio transceiver 31 includes: a second reception unit 31-1 for receiving, as light, the remote control signal from first transmission unit 20-3 of wireless headphone unit 20; an audio input unit 31-2 for receiving the audio signal according to the switching operation of speaker mode switch 37 which receives the speaker mode control signal from monitor microcomputer 32; a modulator 31-3 for modulating the output from audio input unit 31-2; an audio driver 31-4 for outputting the modulated audio signal; and a second transmission unit 31-5 for converting the output from audio driver 31-4 into an optical signal for transmission to first reception unit 20-4.

Figure 5:
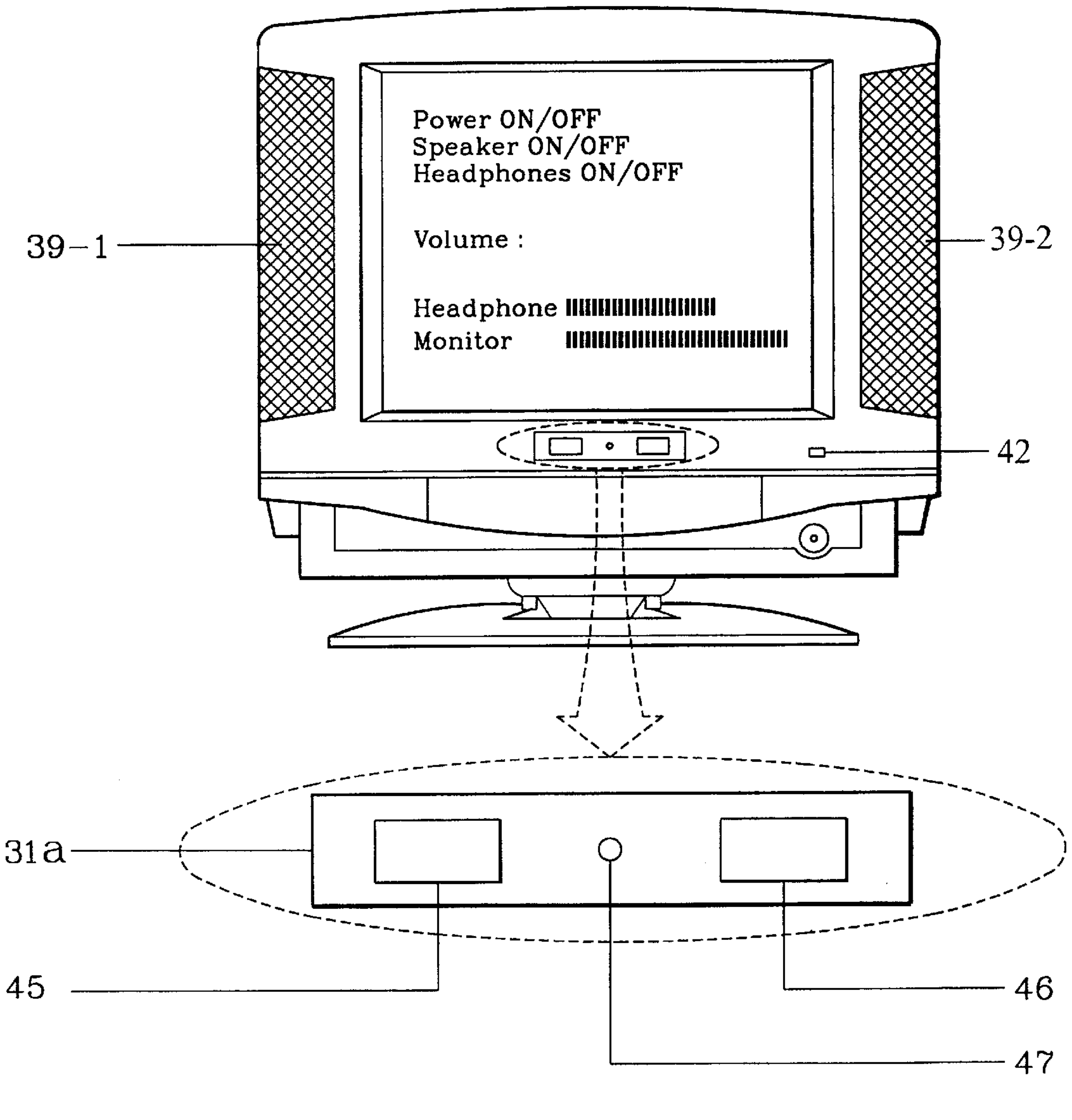
FIG. 5 shows the exterior and OSD picture of a monitor having a monitor control circuit using wireless headphones according to the principles of the present invention.

FIG. 5 is a front view of a monitor having a monitor control circuit using wireless headphones according to the present invention, showing its exterior and OSD picture as it may appear. Here, a pair of monitor speakers 39-1 and 39-2 and a monitor power button 42 and power indicator 47 are shown, and a light emission/reception panel 31*a* has a light emitting section 45 for supplying a light signal to wireless headphone unit 20 and a light reception section 46 for receiving a light signal therefrom. Thus, one frame of the monitor's OSD picture can provide separate status indications for monitor power and the speaker volume and modes of both the wireless headphone unit 20 and the monitor 30.

Figure 6:
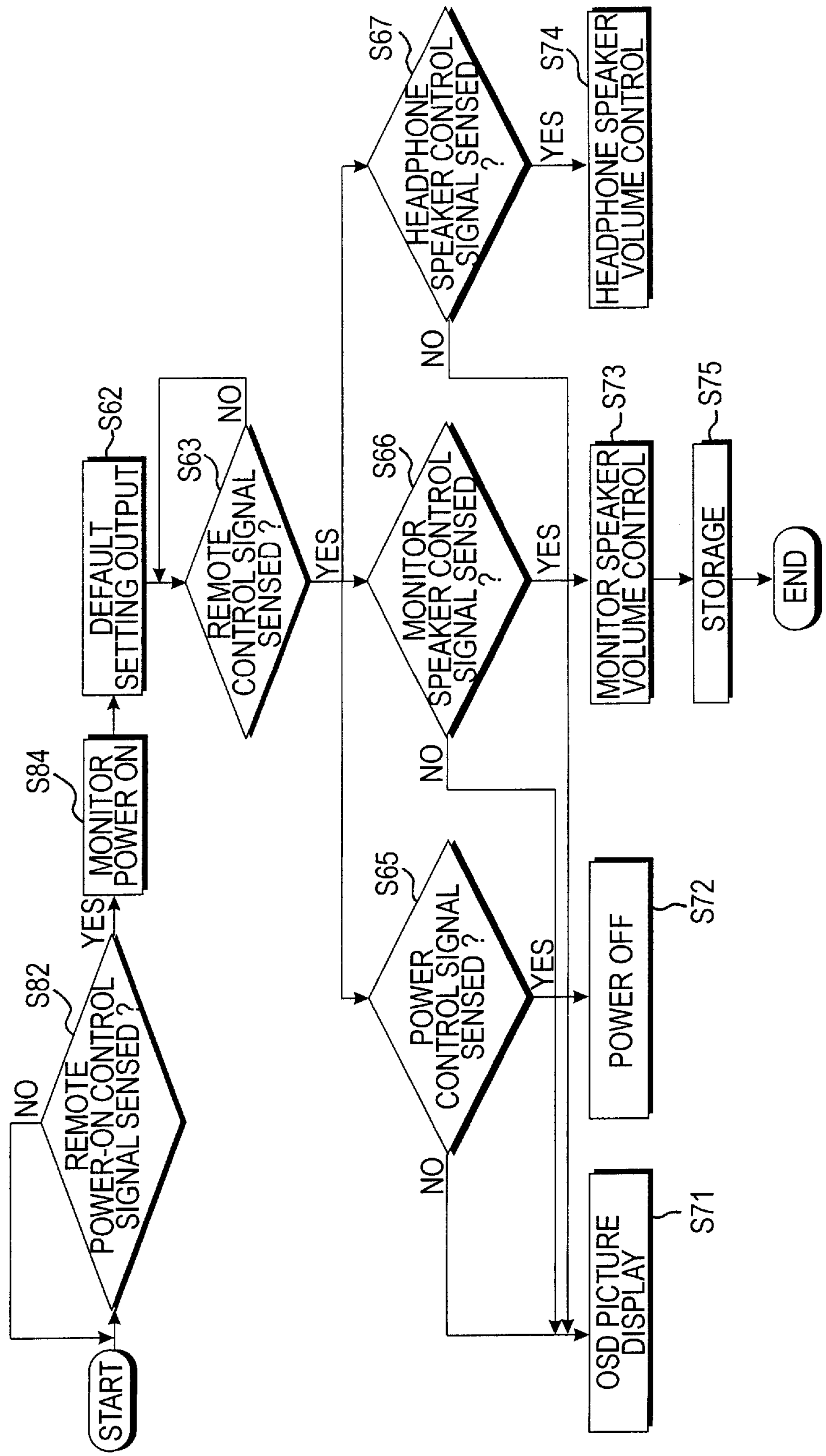
FIG. 6 is a flow diagram showing a method of controlling a monitor using wireless headphones, according to the principles of the present invention.

A method for controlling a monitor using wireless headphones according to the present invention is described below with reference to FIG. 6. The monitor control method includes: a step S82 for determining whether a remote power-on control signal for turning on the monitor is sensed; a step S84 for turning on the monitor when the remote power-on control signal is sensed at step S82; a default setting output step S62 for outputting default settings which establish an initial mode of operation; a remote control signal sensing step S63 for sensing and recognizing a control signal output from wireless headphone unit 20; a power control signal sensing step S65 for determining whether the remote control signal sensed at step S63 is a power control signal; a monitor speaker control signal sensing step S66 for determining whether the remote control signal sensed at step S63 is a monitor speaker control signal; a headphone speaker control signal sensing step S67 for determining whether the remote control signal sensed at step S63 is a headphone speaker control signal; an OSD picture display step S71 for displaying the OSD picture while the user selects remote control commands, when no control signal is sensed at steps S65, S66 or S67; a power-off step S72 for outputting a signal for turning off the monitor power when the control signal sensed at step S65 is a power control signal; a monitor speaker volume control step S73 for controlling the monitor speaker volume when the control signal sensed at step S66 is a monitor speaker control signal; a headphone speaker volume control step S74 for controlling the headphone speaker volume when the control signal sensed at step S67 is a headphone speaker control signal; and a volume control signal storage step S75 for storing the volume control signal when the speaker volume is controlled at steps S73 or S74.

The aforementioned steps are now explained in detail. To turn on the monitor, controller 20-1 of the wireless headphone unit 20 is used, whereby a power-on signal is output through the headphone microcomputer 20-1 and transmitted to monitor 30 via the first transmission unit 20-3, to be sensed at step S82. When the power-on signal is sensed, monitor microcomputer 32 applies a power-on signal to its main power supply (not shown) thus the monitor power is turned on at step S84. Here, if no power-on signal is sensed, the monitor remains in an "off" state (standby).

In step S62, the monitor is normally operated according to the default set data. When a remote control signal is sensed at step S63, i.e., the monitor is remote-controlled using the wireless headphone unit 20, it is determined at steps S65, S66 or S67 whether the sensed signal is the power control signal, monitor speaker control signal or headphone speaker control signal, to turn off the monitor power in step S72, control the volume of the monitor speaker in step S73 or control the volume of the headphone speaker in step S74.

When the control signal sensed at step S63 is not sensed at steps S65, S66 or S77, the OSD picture is displayed in step S71, the user may select one of the control signals corresponding steps S65, S66 and S67. Upon completion of steps S73 and S74, however, the volume control data is stored at step S75, thus completing the procedure.

It will be apparent to those skilled in the art that various modifications can be made in the monitor control circuit and method using wireless headphones of the present invention without departing from the spirit of the invention. Thus, it is intended that the present invention cover such modifications as well as variations thereof within the scope of the appended claims and their equivalents.

What is claimed is:

1. A circuit for controlling a computer monitor receiving a speaker input signal, said circuit comprising:

wireless headphones for outputting a first control signal based on a user input command;

a radio transceiver for generating a second control signal based on the first control signal from said wireless headphones;

a first microcomputer for generating a switching control signal according to the second control signal from said radio transceiver; and switching means for receiving the speaker input signal and selectively outputting the received speaker input signal to said radio transceiver as a controlled audio signal for transmission to said wireless headphones or to an audio amplifier in said monitor for driving a speaker, according to the switching control signal from said first microcomputer.

2. The circuit as claimed in claim 1, wherein said wireless headphones comprise:

a controller for generating a key input signal;

a second microcomputer for generating the first control signal according to the key input signal, in order to remotely control said monitor; and a first transmission unit for converting the first control signal into an optical remote control signal.

3. The circuit as claimed in claim 2, wherein said wireless headphones further comprise a first reception unit for receiving the controlled audio signal transmitted by said radio transceiver.

4. The circuit as claimed in claim 1, wherein said radio transceiver comprises:

a reception unit for receiving the first control signal output from said wireless headphone and outputting a second remote control signal in response thereto; and a transmission unit for converting the controlled audio signal into an optical audio signal for transmission to said wireless headphones.

5. A method of controlling a computer monitor, comprising the sequential steps of:

sensing a remote control signal output from wireless headphones;

determining which one of a plurality of control signals said remote control signal corresponds to when the remote control signal is sensed; and controlling power of said computer monitor or selectively outputting an audio signal to the wireless headphones or a speaker of the computer monitor depending on which one of said plurality of control signals said remote control signal corresponds to in said determining step.

6. The method as claimed in claim 5, wherein said determining step comprises the steps of:

determining whether the remote control signal is a power control signal;

determining whether the remote control signal is a monitor speaker control signal; and determining whether the remote control signal is a headphone speaker control signal.

7. The method as claimed in claim 6, further comprising a step of displaying an on-screen display picture while a user selects a remote control signal, when no remote control signal is sensed.

8. The method as claimed in claim 6, further comprising the steps of:

outputting a signal for turning off the power of said computer, when the remote control signal is determined to be said power control signal;

controlling speaker volume of said speaker and storing a corresponding volume control signal, when the remote control signal is determined to be said monitor speaker control signal; and controlling volume of said wireless headphone and storing a corresponding volume control signal, when the remote control signal is determined to be a headphone speaker control signal.

9. The method as claimed in claim 5, further comprising the step of:

determining whether a remote power-on signal from said wireless headphones is sensed;

maintaining said computer monitor in an off mode until said remote power-on signal is sensed;

turning on said computer monitor when said remote power-on signal is sensed; and operating said computer monitor according to default settings until said remote control signal output from wireless headphones is sensed.

10. A computer monitor control circuit, comprising;

a wireless headphone unit connected to a set of headphones, said wireless headphone unit comprising:

means for inputting user commands;

means for converting said user commands to a remote control signal;

means for converting said remote control signal to an optical remote control signal;

means for receiving a controlled audio signal transmitted optically from a computer monitor; and means for converting said controlled audio signal to a sound signal for output through said set of headphones;

said computer monitor comprising:

means for generating a pre-amplified audio signal by pre-amplifying an audio output signal received from a sound card of a computer;

a radio transceiver for receiving said optical remote control signal from said wireless headphone unit, for converting said optical remote control signal into control data and for transmitting said controlled audio signal to said wireless headphone unit;

means responsive to said control data for outputting a monitor power control signal for controlling power of said computer monitor and for generating a speaker mode selection signal;

a speaker connected to said monitor;

means for driving said speaker; and a speaker mode switch responsive to said speaker mode selection signal for selectively outputting said pre-amplified audio signal to said radio transceiver or to said means for driving said speaker.

11. The computer monitor control circuit as set forth in claim 10, wherein said means responsive to said control data determines whether said control data corresponds to a power-on control signal, a power-off control signal, a monitor speaker control signal or a headphone speaker control signal.

12. The computer monitor control unit as set forth in claim 11, wherein said means responsive to said control data outputs said monitor power control signal when said control data corresponds to said power-on control signal or said power-off control signal.

13. The computer monitor control unit as set forth in claim 11, wherein said means responsive to said control data outputs said speaker mode selection signal when said control data corresponds to said monitor speaker control signal or said headphone speaker control signal.

* * * * *